Oct. 29, 1929.  O. SEHMISCH  1,733,910
ANTI-FRICTION BEARING
Filed Sept. 28, 1928

O. Sehmisch
INVENTOR

Patented Oct. 29, 1929

1,733,910

UNITED STATES PATENT OFFICE

OTTO SEHMISCH, OF DUSSELDORF, GERMANY, ASSIGNOR OF ONE-HALF TO THE FIRM MASCHINENFABRIK "RHEINLAND" A.-G., OF DUSSELDORF, GERMANY

ANTIFRICTION BEARING

Application filed September 28, 1928, Serial No. 308,896, and in Germany April 28, 1927.

My invention relates to anti-friction bearings of the ball or roller type and it is an object of my invention to provide a bearing of this type which is secured on its support by cheap and simple means, and held thereon reliably.

To this end, I secure on the support which may be a pin, a journal, or the like, a divided bush having a tapered seat for the inner race of the bearing, and on the small end of the seat I arrange means for retaining the race on the seat, which means are integral with the seat.

In a preferred embodiment of my invention I provide a thin flange or a plurality of thin lugs at the small end of the seat which are beaded over after the inner race has been seated on the tapered seat, so as to retain the race thereon. As a rule, a complete flange is preferred to lugs.

On account of its simplicity, reliability and cheapness a bearing of this type is particularly suitable for agricultural machines as thrashing machines and the like but it may be applied to any other type of mechanism.

In the accompanying drawing, a ball bearing for the big end of the connecting rod of a thrashing machine is illustrated by way of example.

In the drawing

Figures 1, 2:
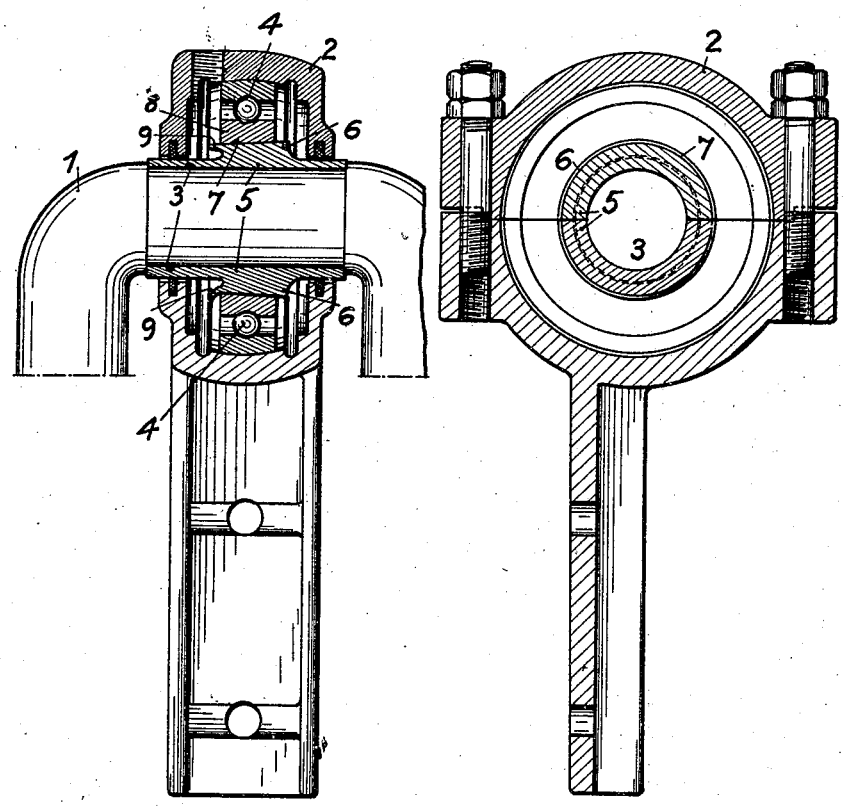
Fig. 1 is a section of the bearing in the axis of the crank pin.
Fig. 2 is a transverse central section.

Referring now to the drawing, 1 is the crank shaft, 2 is the big end of the connecting rod, 3 is the crank pin, 4 is an intifriction bearing which is here shown as a ball bearing but obviously might be a roller bearing, 5 is a divided bush on the pin 3, which is exactly fitted on the pin, 6 is a seat formed on the parts of the bush 5 at their centre, 7 is the tapering face of the bush parts on the seat 6, and 8 is the inner race of the ball bearing 4.

The diameter of the seat 6 must be such that the bore of the inner race 8 will permit its being threaded on the curved parts of the crank shaft 1.

At the small end of the tapered seat 6 a flange 9 is formed which is comparatively thin so as to be readily beaded over.

When the inner race 8 is seated with a tight fit on the seat 6 with its bore which obviously must be tapering like the seat, the two parts of the bush 5 are forced together and are firmly secured on the crank pin 3. This prevents turning of the bush on the pin. After the inner race 8 has been placed in position on the bush 5 the flange 9 is beaded over throughout its length, or, preferably, at some points, as shown in the lower half of Fig. 1, so as to retain the inner race on the sleeve 5 and to prevent coming off of the bearing.

As mentioned, lugs may be provided instead of a continuous flange 9 but I prefer the continuous flange.

The big end 2 is designed, and the outer race of the ball bearing 4 is secured therein, in the usual manner.

As will appear from the specification and the drawing my novel bearing does not require any alteration of the crank shaft and on the big end, and the bush 5 is extremely simple so that its presence will not complicate the bearing in any appreciable manner, and not unduly increase its initial cost.

I claim:

1. An anti-friction bearing comprising an inner race, a support, a divided bush adapted to be seated on said support, a tapered seat for said inner race on said bush, and a flange integral with the small end of said seat adapted to be beaded against the race so as to retain said race on said seat and fix the bush on the support.

2. An antifriction bearing comprising an inner race, a support, a two part bush adapted to be seated on said support, a raised seat surrounding the bush and integral therewith of less width than the bush and having the outer surface tapered towards the longitudinal axis of the bush, the inner periphery of the race being correspondingly tapered for frictional engagement with the tapered surface of the seat for securing the bush to the support, an annular flange integral with the small end of the seat and normally lying flush with the seat so as to permit of the application of the inner race, and portions of the flange adapted to be beaded so as to retain said race on said seat.

In testimony whereof I affix my signature.

OTTO SEHMISCH.